United States Patent [19]
Amelunxen

[11] 3,825,804
[45] July 23, 1974

[54] CLAMPED DISC TYPE SEMICONDUCTOR ASSEMBLY WITH BUILT-IN CONTACT PRESSURE GAGE

[75] Inventor: Bernd Amelunxen, Lampertheim, Germany

[73] Assignee: BBC Brown Boveri & Company Limited, Baden, Switzerland

[22] Filed: Feb. 22, 1973

[21] Appl. No.: 334,975

[30] Foreign Application Priority Data

Mar. 3, 1972 Germany ........................... 2210180

[52] U.S. Cl. ...... 317/234 R, 317/234 G, 317/234 P
[51] Int. Cl. ............................ H01l 3/00, H01l 5/00
[58] Field of Search .................. 317/234, 1, 4, 6, 11

[56] References Cited

UNITED STATES PATENTS

| | | | |
|---|---|---|---|
| 3,571,663 | 3/1971 | Hungate | 317/234 P |
| 3,611,068 | 10/1971 | Fujita | 317/234 P |
| 3,614,513 | 1/1971 | Allgaier | 313/269 |
| 3,624,452 | 11/1971 | Hayward | 317/234 P |
| 3,661,013 | 5/1972 | Wilcox | 317/234 R |
| 3,686,541 | 8/1972 | Livezey et al. | 317/234 P |

FOREIGN PATENTS OR APPLICATIONS

| | | | |
|---|---|---|---|
| 441,966 | 4/1925 | Germany | 317/234 |

OTHER PUBLICATIONS

IBM Technical Disclosure Bulletin; Forming Electrical Contacts; by Ahearn; Vol. 11 No. 12 May 1969.

*Primary Examiner*—Andrew J. James
*Attorney, Agent, or Firm*—Pierce, Scheffler & Parker

[57] ABSTRACT

A clamped semiconductor disc assembly wherein the semiconductor disc is located between a pair of pressure plates and the clamping force is applied by way of a leaf spring and clamping bolts which extend through the pressure plates and the end portions of the leaf spring. As the bolts are tightened, a clamping pressure is transmitted from a contact point at the center of the leaf spring to a projection provided on one of the pressure plates, the pressure being transmitted through the projection to the pressure plate and thence to the semiconductor disc along an axis coincident with the center of the disc. Simultaneously the projection functions as a fulcrum for the leaf spring resulting in a deflection of the end portions of the spring, and the amount of this deflection thus becomes a measure of the clamping force which can be read off on a scale type gage, wherein the end of the spring serves as the pointer element of the gage in association with a stationary scale supported by the pressure plate.

1 Claim, 1 Drawing Figure

PATENTED JUL 23 1974
3,825,804
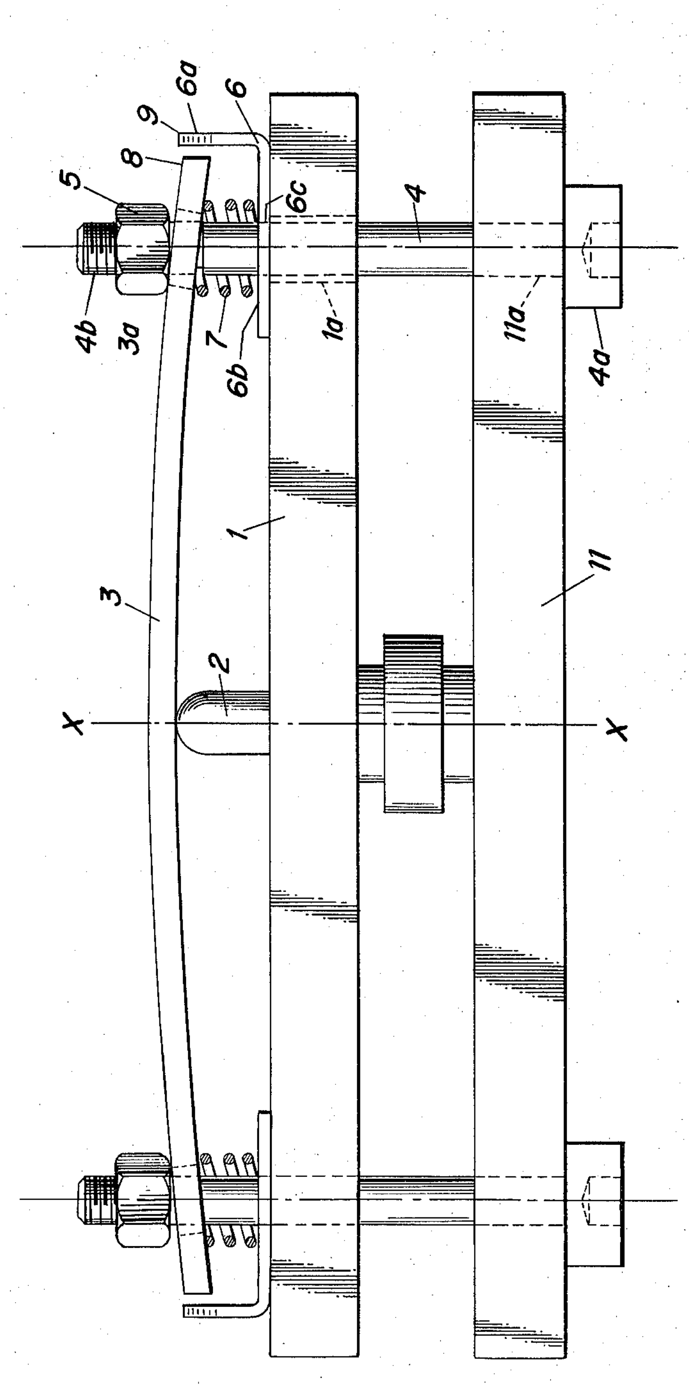

CLAMPED DISC TYPE SEMICONDUCTOR ASSEMBLY WITH BUILT-IN CONTACT PRESSURE GAGE

The present invention relates to semiconductors of the disc type, e.g., those made of silicon which serve as diodes or thyristors for controlling high current amplitudes and more particularly to an improved arrangement for mounting the semiconductor disc between two plates which apply pressure to the opposite faces of the disc thereby to establish both a good electrical contact as well as a good heat transfer contact. An improved clamping arrangement for the pressure plates is employed by means of which an adjustable contact pressure can be established as well as a gage which enables the contact pressure to be read off. Thus, one is enabled to adjust and check and also monitor if desired, the pressure established by the plates on the semiconductor disc element which is clamped between them.

In the construction of present day high-power silicon semiconductor devices such as thyristors and diodes, it is quite common to clamp the semiconductor disc under pressure between contact plates to establish a good electrical contact with the opposite faces of the discs since the soldering of silicon discs of large diameter often involves major difficulties. For the pressure-contacting, it is essential to establish the desired pressure within the narrowest possible tolerance range and to also make certain that the pressure is applied uniformly throughout the area of the semiconductor faces, i.e., without any tilting effect. Only then can one be certain of attaining optimum conditions for passage of current through the body of the semiconductor, as well as heat transfer at the faces of the semiconductor to the pressure-applying plates which thus serve as heat sinks for removing heat generated internally of the semiconductor structure by passage of high-power currents through it.

Various mounting arrangements of this general type wherein the semiconductor is clamped between pressure-applying plates by means including clamping bolts and cup or helical type springs have been developed and typical prior art constructions are disclosed, for example, in published German Pat. Specification Nos. DAS 1,276,209 and DAS 1,204,751.

One disadvantage of these known types of semiconductor clamping arrangements is that it is not possible to make a check to determine if the pressure is being applied uniformly to the semiconductor disc, or if a preselected contact pressure has actually been attained. One reason for this is that the friction between individual springs may be considerable. Furthermore, during maintenance work, it is difficult at best, if not impossible, to check out the amount of the pressure being applied by the contact plates to determine whether or not it agrees with the pressure level desired.

The object of the present invention is therefore to provide an improved clamping arrangement for the pressure plates by means of which an adjustable contact pressure with the semiconductor disc can be initially established, as well as a simple gage associated with the clamping structure which enables one to both adjust and monitor the pressure during servicing in order to determine whether or not the surface pressure originally set has been retained.

The improved semiconductor clamping device in accordance with the invention is principally characterized by use of a leaf spring the center of which establishes a point of contact with one of the pressure plates while the opposite ends of the spring are provided with openings for receiving clamping bolts which pass through the pressure plates. Tightening of the nuts on the clamping bolts develops the clamping pressure which is applied through the leaf spring and pressure plates to the opposite faces of the semiconductor disc and simultaneously results in a downward bowing of the ends of the leaf spring about a fulcrum located at the spring center which is located coaxially with the center of the semiconductor disc. Downward deflection of the ends of the leaf spring is proportional to the pressure applied to the opposite faces of the semiconductor disc and hence can be used as a simple measure of the applied pressure, each end of the spring serving as a pointer movable across a stationary scale mounted on one of the pressure plates. By use of this very simple gage structure at each end of the leaf spring, one is not only enabled to set the contact pressure at any desired level but also to check the pressure at any time thereafter, as well as assure that the pressure will be uniformly distributed across the opposite faces of the semiconductor disc since the clamping bolts will always be tightened uniformly so that the pressure gages at opposite ends of the leaf spring always read alike.

The scale associated with each end of the leaf spring can be affixed in a simple manner to the upwardly extending leg of an angle member, the other horizontal leg of which rests upon the upper surface of one of the pressure plates and is provided with a pass-through opening for the clamping bolt. A helical spring is applied to the shank of the clamping bolt between the underside of the leaf spring and the angle member.

Alternatively, it is of course possible to arrange the pointer and scale elements of the pressure indicating gage such that the scale is attached to the end of the leaf spring while the pointer element is mounted stationarily on the angle member. Also, it is possible to associate an electrical switching device with the gage structure in order to control an alarm circuit in the event that the actual contact pressure departs from the level desired to be maintained.

One suitable embodiment of the improved clamping structure for the semiconductor disc with its simple, integrated gage for reading off the contact pressure will be described in detail hereinafter in conjunction with the accompanying drawing, the single FIGURE of which is a view in elevation illustrating the combined clamping and gage structure at both ends of the pressure plates and the associated ends of the leaf spring.

With reference now to the drawing, the clamped semiconductor assembly in accordance with the invention includes a pair of metallic pressure plates 1 and 11 located at opposite sides of a disc-type semiconductor element 10 and which function to apply a clamping pressure to the latter. These plates have considerable mass and are of sufficient thickness to remain rigid and parallel when clamped and can be made of an electrically conductive material so that the plates serve as electrical leads to the opposite faces of the semiconductor element and also as heat sinks so as to dissipate heat produced within the body of the semiconductor element when it is operating and carrying currents of great magnitude.

A rod type projection 2 having a rounded upper end 2a extends upwardly from the upper pressure plate 1 concentrically with the assembly axis *x–x* extending through the center of the semiconductor disc 10 and, serves as a fulcrum about which the opposite ends of a leaf spring 3 are bowed. The projection 2 makes a point contact with the center of the leaf spring 3.

A clamping bolt 4 is provided for each end of the pressure plates 1 and 11. Bolt 4 passes through aligned openings 1*a*, 11*a* in the pressure plates 1 and 11 and also through an aligned opening 3*a* in the end of leaf spring 3. The head 4*a* of bolt 4 bears against the under side of the lower pressure plate 11 and to the upper bolt end 4*b*, which is threaded, a tightening nut 5 is applied. Located on the shank of bolt 4 between the pressure plate 1 and leaf spring 3 is a helical spring 7. When the nut 5 at each end of leaf spring 3 is tightened, the spring 3 will bow downwardly about its center because of its contact with the projection 2, as depicted in the drawing thus compressing spring 7, while simultaneously establishing a tensional stress in bolt 4 which results in the desired clamping pressure applied to opposite faces of the semiconductor disc assembly 10.

In accordance with the invention, since the extent to which the leaf spring 3 becomes bowed as the nuts 5 at each end thereof are tightened is directly related to the amount of the clamping pressure applied by plates 1 and 11 to the semiconductor disc assembly 10, the amount of the deflection at the end 8 of spring 3 constitutes a measure of this clamping pressure. Spring end 8 thus serves as the "pointer" element of a simple measuring device or gage which moves along a vertically placed scale 9 applied to the upwardly extending leg 6*a* of an angle member 6, the horizontally extending leg 6*b* of this angle member being applied against the upper face of pressure plate 1 and beneath helical spring 7. This horizontally extending leg 6*b* is provided with a pass-through opening 6c for the shank of clamping bolt 4. Thus, the clamping pressure exerted principally through the projection 2 and thence through plate 1 onto the semiconductor disc assembly 10 can be easily adjusted to any desired level as the nuts 5 are tightened and read off on scale 9.

If desired, a switching mechanism can be located in the vicinity of the ends of the leaf spring and gage such that the switch contacts will be actuated in the event that the ends of the spring deviate from the desired position of adjustment determined by tightening of the clamping bolts.

I claim:

1. A clamped semiconductor disc assembly comprising first and second rigid pressure plates between which the semiconductor disc is disposed, a leaf spring located to one side of said first pressure plate, means establishing a direct pressure application point between the center of said leaf spring and a spherical pivot on said first pressure plate, said point of pressure application being exactly along the axis extending through the center of said semiconductor disc, a pair of clamping bolts extending respectively through said pressure plates and the end portions of said leaf spring, said bolts having clamping nuts thereon, said clamping nuts when tightened serving to apply pressure to said semiconductor disc by way of said leaf spring accompanied by deflection thereof about said centrally located spherical pivot, gage means including scale and pointer elements correlated to each end of said leaf spring for measuring the deflection thereof, the pointer element of each said gage means being constituted by an end of said leaf spring and the scale element of each said gage being mounted on said first pressure plate by means of an angle member, one leg of said angle member being provided with said scale element and the other leg of said angle member being supported on the face of said first pressure plate, said other leg of said angle member including an opening therethrough for passage of said clamping bolt, and there being included a helical spring located on said bolt intermediate said other leg of said angle member and said leaf spring.

* * * * *